(12) United States Patent
Fujisawa

(10) Patent No.: US 7,369,337 B2
(45) Date of Patent: May 6, 2008

(54) MAGNETIC FIELD APPLICATION APPARATUS, MAGNETIC TRANSFER APPARATUS AND METHOD FOR PRODUCING MAGNETIC RECORDING MEDIUM

(75) Inventor: Michinobu Fujisawa, Odawara (JP)

(73) Assignee: Fujifilm Corporation, Tokyo (JP)

( * ) Notice: Subject to any disclaimer, the term of this patent is extended or adjusted under 35 U.S.C. 154(b) by 135 days.

(21) Appl. No.: 11/332,183

(22) Filed: Jan. 17, 2006

(65) Prior Publication Data

US 2006/0158818 A1    Jul. 20, 2006

(30) Foreign Application Priority Data

Jan. 18, 2005  (JP)  ............................. 2005-010372

(51) Int. Cl.
*G11B 5/86* (2006.01)
(52) U.S. Cl. .............................. 360/17; 360/15; 360/16
(58) Field of Classification Search ..................... None
See application file for complete search history.

(56) References Cited

U.S. PATENT DOCUMENTS

| | | | | |
|---|---|---|---|---|
| 6,331,744 B1 * | 12/2001 | Chen et al. | .................. | 310/171 |
| 6,501,357 B2 * | 12/2002 | Petro | ........................... | 335/229 |
| 6,577,459 B1 * | 6/2003 | Komatsu et al. | ............... | 360/15 |
| 6,594,099 B2 * | 7/2003 | Serizawa | ...................... | 360/66 |
| 6,602,301 B1 * | 8/2003 | Komatsu et al. | ............... | 360/17 |
| 6,747,823 B2 * | 6/2004 | Saito et al. | .................... | 360/17 |
| 6,813,105 B2 * | 11/2004 | Takano | ......................... | 360/17 |
| 6,867,935 B2 * | 3/2005 | Komatsu et al. | ............... | 360/17 |
| 6,954,317 B2 * | 10/2005 | Aoki et al. | .................... | 360/17 |

FOREIGN PATENT DOCUMENTS

JP    2003-272143 A    9/2003

* cited by examiner

*Primary Examiner*—Hoa Thi Nguyen
*Assistant Examiner*—Dismery Mercedes
(74) *Attorney, Agent, or Firm*—Sughrue Mion, PLLC

(57) ABSTRACT

A magnetic field application apparatus includes a pair of magnetic field application means, each of which is arranged, at least during application of a magnetic field, on either side of a magnetic field application target so as to face each other, and which generate a magnetic field in a predetermined direction. Each of the magnetic field application means includes a pair of magnetic portions which generate a magnetic field in a desired direction from one of the magnetic portions toward the other magnetic portion, and of which the polarities on the side facing the magnetic field application target are different from each other. Each of the pair of magnetic portions is formed so that magnetic force applied to the magnetic field application target becomes weaker stepwise or continuously from the side of the magnetic portion, facing the other magnetic portion, toward the opposite side thereof.

13 Claims, 7 Drawing Sheets

INTENSITY OF MAGNETIC FIELD

POSITION WITH RESPECT TO HORIZONTAL DIRECTION

RELATED ART

MAGNETIC FIELD APPLICATION APPARATUS, MAGNETIC TRANSFER APPARATUS AND METHOD FOR PRODUCING MAGNETIC RECORDING MEDIUM

BACKGROUND OF THE INVENTION

1. Field of the Invention

The present invention relates to a magnetic field application apparatus for initially magnetizing a medium onto which information is transferred and/or for reversing magnetization thereof. The present invention also relates to a magnetic transfer apparatus which includes the magnetic field application apparatus. The present invention also relates to a method for producing a magnetic recording medium.

2. Description of the Related Art

As a technique for producing a magnetic recording medium, a magnetic transfer technique is well known. According to the magnetic transfer technique, information corresponding to uneven patterns formed on a surface of an original disk (master information carrier) for transfer is magnetically transferred onto a medium (slave medium). Generally, in magnetic transfer, the medium onto which information is transferred is initially magnetized in a specific track direction. Then, the medium onto which information is transferred and the master information carrier are placed in close contact with each other, and a magnetic field in a direction opposite to that of the initial magnetization is applied. Accordingly, magnetization of the medium onto which information is transferred is reversed based on the uneven patterns on the surface of the original disk for transfer. Consequently, signal patterns are transferred onto the medium onto which information is transferred.

A magnetic field application apparatus for initially magnetizing a medium onto which information is transferred and/or for reversing magnetization thereof is disclosed in Japanese Unexamined Patent Publication No. 2003-272143 or the like.

A schematic diagram of the magnetic field application apparatus according to the related art is illustrated in FIG. 7A (a side view in a track direction). In FIG. 7A, the magnetic field application apparatus according to the related art includes a magnetic field application means 110 which has a pair of magnets 111 and 112, of which the polarities on the side facing a magnetic field application target 120 are different from each other. The direction of a magnetic field generated from one of the magnets toward the other magnet is a desired direction $H_x$. If the magnetic field application means 110 is placed on one side of the magnetic field application target 120, an unnecessary magnetic field in a perpendicular direction is applied to the magnetic field application target 120. The unnecessary magnetic field is a magnetic field in a direction other than the track direction (horizontal direction). Therefore, there is a possibility that the unnecessary magnetic field affects the accuracy of magnetic transfer. Therefore, the magnetic field application means 110 is provided on either side of the magnetic field application target 120, as illustrated in FIG. 7A.

In the magnetic field application apparatus illustrated in FIG. 7A, the magnetic field application target 120 is rotated relative to the magnetic field application means 110. Accordingly, the magnetic field in the desired direction $H_x$ can be applied to the entire surface of the magnetic field application target 120.

In the magnetic field application apparatus illustrated in FIG. 7A, a magnetic field indicated with an arrow is generated. Therefore, the intensity of a magnetic field in a horizontal direction, applied to the magnetic field application target 120, is distributed, as schematically illustrated in FIG. 7B. In FIG. 7B, the horizontal axis shows the position of the magnetic field application target 120, corresponding to FIG. 7A, with respect to the horizontal direction, and the vertical axis shows the intensity of the magnetic field. In the vertical axis, the intensity of the magnetic field in the desired direction $H_x$ is represented by positive (+) values. Here, the magnetic field in the perpendicular direction is cancelled out by the pair of magnetic field application means 110. Therefore, the magnetic field in the perpendicular direction is not applied to the magnetic field application target 120.

In the magnetic field application apparatus, magnetic fields in various directions are generated from the magnetic field application means 110. Therefore, a magnetic field in a direction $H_{NG}$ opposite to the desired direction $H_x$ is applied to the magnetic field application target 120 at positions before and after the magnetic field application means 110 (immediately before the magnetic field application target 120 enters a position between the pair of magnetic field application means 110 and immediately after the magnetic field application target 120 moves out therefrom). In recent years, as the capacity of a magnetic field recording medium has increased, the intensity of a magnetic field applied to the magnetic field application target 120 has become higher. Therefore, an influence of the magnetic field in the opposite direction $H_{NG}$ on magnetic transfer has become substantial.

SUMMARY OF THE INVENTION

In view of the foregoing circumstances, it is an object of the present invention to provide a magnetic field application apparatus for initially magnetizing a medium onto which information is transferred and/or for reversing magnetization thereof. Particularly, it is an object of the present invention to provide a magnetic field application apparatus which performs highly accurate magnetic transfer by preventing application of an unnecessary magnetic field in a direction other than a desired direction to a magnetic field application target when magnetic transfer is performed. Further, it is an object of the present invention to provide a magnetic transfer apparatus including the magnetic field application apparatus. Further, it is an object of the present invention to provide a method for producing a magnetic recording medium using the magnetic transfer apparatus.

A magnetic field application apparatus according the present invention is a magnetic field application apparatus for initially magnetizing a slave medium and/or for reversing magnetization thereof in magnetic transfer of a signal pattern onto the slave medium, wherein the magnetic transfer is performed by initially magnetizing the slave medium in a predetermined direction, by placing the slave medium and an original disk for transfer in close contact with each other after initial magnetization and by applying a magnetic field in a direction opposite to that of initial magnetization so as to reverse magnetization of the slave medium based on a pattern on a surface of the original disk for transfer, the apparatus comprising:

a pair of magnetic field application means, each of which is arranged, at least during application of a magnetic field, on either side of a magnetic field application target so as to face each other, and which generate a magnetic field in a desired direction, wherein each of the magnetic field application means includes a pair of magnetic portions which generate a magnetic field in a desired direction from one of the magnetic portions toward the other magnetic portion, and of which the polarities on the side facing the magnetic field application target are different from each other, wherein each of the magnetic portions is formed so that magnetic force applied to the magnetic field application target becomes weaker stepwise or continuously from the side of the magnetic portion, facing the other magnetic portion, toward the opposite side thereof.

In the present invention, the "magnetic field application target" is a "medium onto which information is transferred (slave medium)" in initial magnetization. The "magnetic field application target" is "the slave medium and an original disk for transfer (master information carrier), which are placed in close contact with each other" in reversing magnetization.

It is preferable that each of the pair of magnetic portions includes a plurality of magnets which are arranged so that magnetic force applied to the magnetic field application target becomes weaker from the side of the magnetic portion, facing the other magnetic portion, toward the opposite side thereof. Particularly, it is preferable that each of the pair of magnetic portions includes a plurality of magnets which are arranged so that a distance between each of the plurality of magnets and the magnetic field application target becomes longer from the side of the magnetic portion, facing the other magnetic portion, toward the opposite side thereof.

In the magnetic field application apparatus according to the present invention, if the slave medium is disk-shaped and the pair of magnetic field application means applies a magnetic field in a track direction to the magnetic field application target, it is preferable that the magnetic field application apparatus further includes a reverse magnetic field generation means. The reverse magnetic field generation means generates a magnetic field in a direction opposite to that of the magnetic field generated by the magnetic field application means. The reverse magnetic field generation means is provided on the side of the pair of magnetic field application means, closer to the center of the magnetic field application target.

In the magnetic field application apparatus according to the present invention, it is preferable that at least one of the pair of magnetic field application means further includes a permanent magnet between the pair of magnetic portions, which is magnetized in a direction perpendicular to that of magnetization of the pair of magnetic portions, and which generates a magnetic field in the same direction as that of the magnetic field generated from one of the pair of magnetic portions toward the other magnetic portion.

A magnetic transfer apparatus according to the present invention is a magnetic transfer apparatus for transferring a signal pattern onto a slave medium by initially magnetizing the slave medium in a predetermined direction, by placing the slave medium and an original disk for transfer in close contact with each other after initial magnetization and by applying a magnetic field in a direction opposite to that of initial magnetization so as to reverse magnetization of the slave medium based on a pattern on a surface of the original disk, the apparatus comprising:

a magnetic field application apparatus for initially magnetizing the slave medium and/or for reversing magnetization thereof according to the present invention.

A method for producing a magnetic recording medium according to the present invention is a method for producing a magnetic recording medium, the method comprising the steps of:

initially magnetizing a slave medium in a predetermined direction;

placing the slave medium and an original disk for transfer in close contact with each other after initial magnetization; and applying a magnetic field in a direction opposite to that of initial magnetization so as to reverse magnetization of the slave medium based on a pattern on a surface of the original disk for transfer, wherein the slave medium is initially magnetized and/or magnetization of the slave is reversed using a magnetic field application apparatus according to the present invention.

The magnetic field application apparatus according to the present invention includes a pair of magnetic field application means, each of which is placed, at least during application of a magnetic field, on either side of the magnetic field application target so as to face each other, and which generate a magnetic field in a desired direction. Therefore, a magnetic field in a perpendicular direction is cancelled out by the pair of magnetic field application means. Hence, an unnecessary magnetic field in the perpendicular direction is not applied to the magnetic field application target.

Further, in the magnetic field application apparatus according to the present invention, each of the magnetic field application means includes a pair of magnetic portions which generate a magnetic field in a desired direction from one of the magnetic portions toward the other magnetic portion, and of which the polarities on the side facing the magnetic field application target are different from each other. Further, each of the magnetic portions is formed so that magnetic force applied to the magnetic field application target becomes weaker stepwise or continuously from the side of the magnetic portion, facing the other magnetic portion, toward the opposite side thereof.

As described above, in the magnetic field application apparatus according to the present invention, generation of a magnetic field in a perpendicular direction and a magnetic field in a direction opposite to a desired direction is prevented. Therefore, it is possible to perform highly accurate magnetic transfer by preventing application of an unnecessary magnetic field to the magnetic field application target.

DESCRIPTION OF THE PREFERRED EMBODIMENTS

Hereinafter, embodiments of the present invention will be described with reference to the attached drawings. In each of the drawings, patterns or the like are simplified so as to be easily recognized.

In a magnetic field application apparatus according to the present invention, first, a medium onto which information is transferred is initially magnetized in a predetermined direction. Then, the medium onto which information is transferred is placed in close contact with an original disk for transfer, and a magnetic field in a direction opposite to that of the initial magnetization is applied. Accordingly, the magnetization of the medium onto which information is transferred is reversed based on patterns formed on the surface of the original disk for transfer. The magnetic field application apparatus is used to initially magnetize the medium onto which information is transferred and/or to reverse magnetization thereof when magnetic transfer is performed so as to transfer signal patterns onto the medium.

"Principle of Magnetic Transfer"

Figure 1A:
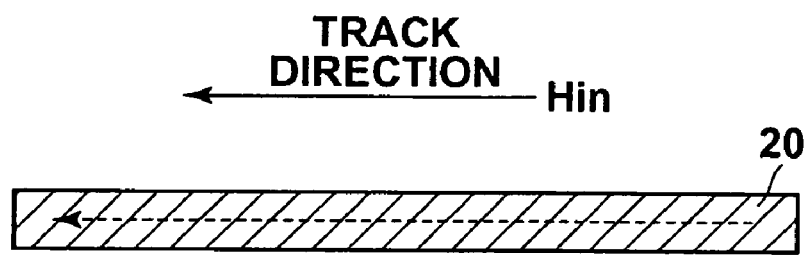
FIG. 1A is a diagram illustrating the principle of magnetic transfer.
Figure 1B:
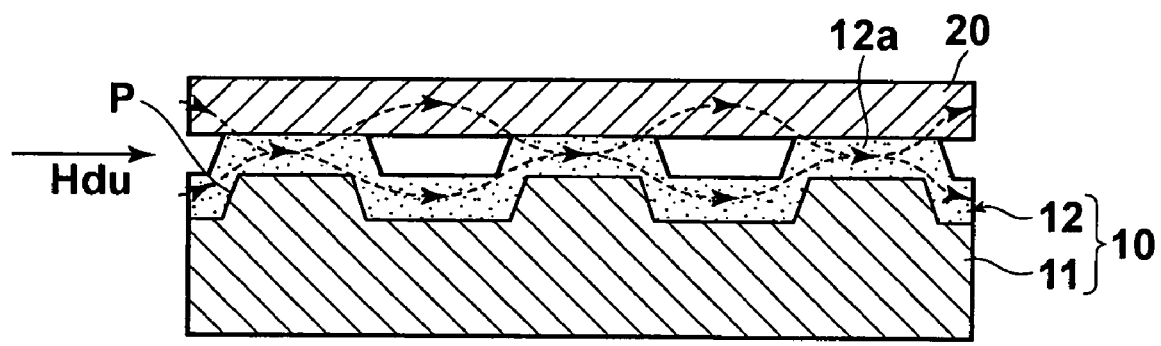
FIG. 1B is a diagram illustrating the principle of magnetic transfer.

Before describing the magnetic field application apparatus, the principle of magnetic transfer will be described with reference to FIGS. 1A and 1B. FIGS. 1A and 1B are sectional views of an original disk for transfer and a medium onto which information is transferred in the direction of the thickness thereof.

Disk-shaped objects (please refer to reference numeral 30 in FIGS. 2A and 2B) are used as the original disk for transfer and the medium onto which information is transferred. Each of the disk-shaped objects has an opening at the center thereof when viewed from the top thereof. As illustrated in FIG. 1B, a master information carrier which has a mask base plate (substrate) 11 made of metal or the like and a magnetic layer 12 is, for example, used as an original disk 10 for transfer. The mask base plate 11 has very fine uneven patterns (transfer patterns) P corresponding to transfer information on the surface thereof, and the magnetic layer 12 is deposited on the surface of the master base plate 11 along the shape of the surface. Further, a slave medium which has a magnetic recording layer on one side or both sides thereof is used as a medium 20 onto which information is transferred.

As illustrated in FIG. 1A, a magnetic field $H_{in}$ in a specific track direction is applied to the medium (slave medium) 20, in advance, onto which information is transferred. Accordingly, a magnetic recording layer (not illustrated) is initially magnetized. As illustrated in FIG. 1B, the initially-magnetized slave medium 20 and the original disk 10 for transfer are placed in close contact with each other, and a magnetic field $H_{du}$ in a direction opposite to that of the initial magnetization is applied. In this case, the magnetic field $H_{du}$ for transfer is substantially selectively absorbed only by protrusions 12a of the magnetic layer 12 of the original disk 10 for transfer, which are in close contact with the slave medium 20. Therefore, in the magnetic recording layer of the slave medium 20, the initial magnetization in a portion which is in close contact with the protrusions 12a is not reversed, and the initial magnetization in the remaining portion is reversed. Accordingly, magnetic patterns corresponding to the uneven patterns P of the original disk 10 for transfer are magnetically transferred onto the slave medium 20, and a magnetic recording medium is produced.

"Magnetic Field Application Apparatus"

First Embodiment

Figure 2A:
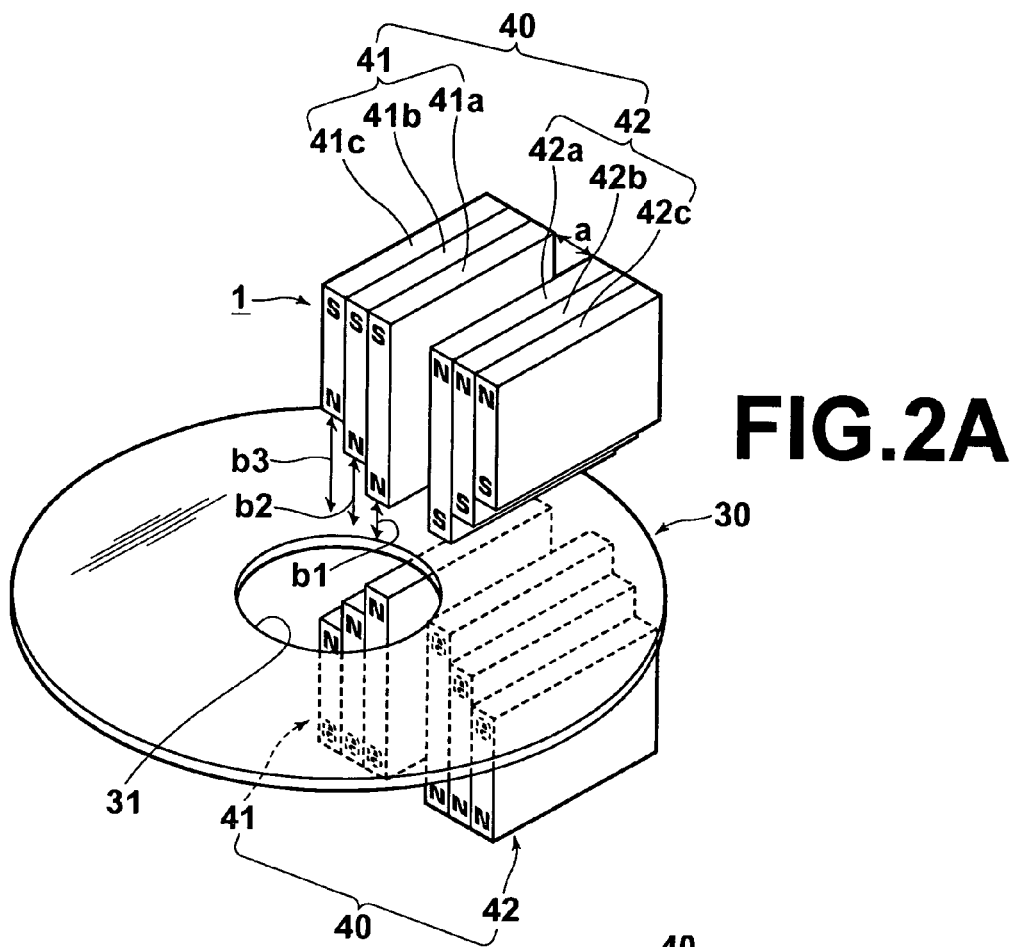
FIG. 2A is a perspective view of a magnetic field application apparatus according to a first embodiment of the present invention.
Figure 2B:
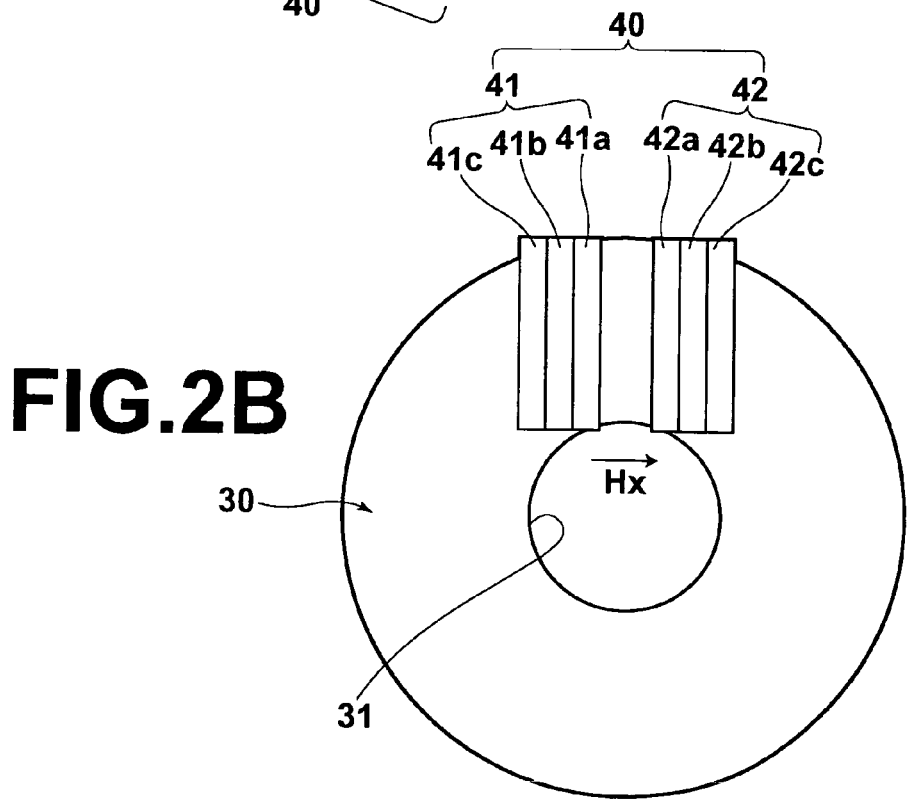
FIG. 2B is a top view of the magnetic field application apparatus according to the first embodiment of the present invention.

Next, a magnetic field application apparatus according to a first embodiment of the present invention will be described with reference to FIGS. 2A and 2B. FIG. 2A is a perspective view, and FIG. 2B is a top view. In FIGS. 2A and 2B, reference numeral 30 denotes a magnetic field application target. The "magnetic field application target" is "the medium 20 onto which information is transferred" in initial magnetization, and the "magnetic field application target" is "the medium 20 onto which information is transferred and the original disk 10 for transfer which are in close contact with each other" in reversing magnetization The magnetic field application apparatus 1 includes a pair of magnetic field application means 40 as a major part. Each of the pair of magnetic field application means 40 is arranged, at least during application of a magnetic field, on either side of the magnetic field application target 30 so as to face each other. The pair of magnetic field application means 40 generates a magnetic field in a desired direction $H_x$. The pair of magnetic field application means 40 is placed only on one side of the opening 31 at the center of the magnetic field application target 30. The desired direction $H_x$ is the direction $H_{in}$ in initial magnetization, as illustrated in FIG. 1A, and the desired direction $H_x$ is the direction $H_{du}$ in magnetization reversal, as illustrated in FIG. 1B.

Figure 4:
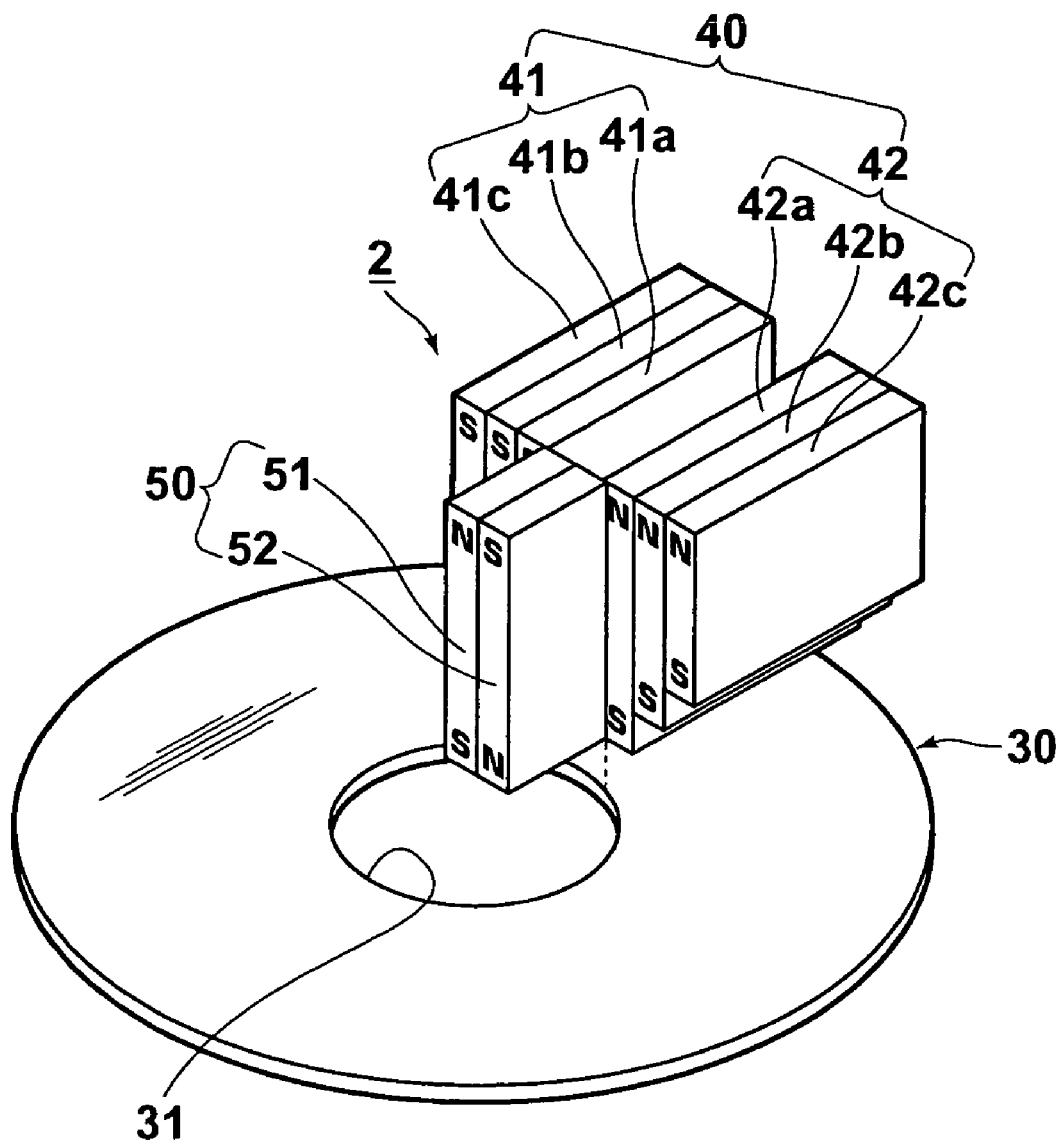
FIG. 4 is a perspective view of a magnetic field application apparatus according to a second embodiment of the present invention.

It is preferable that the magnetic field application target 30 is held by an openable/closable holder (not illustrated) and that a magnetic field is applied to the magnetic field application target 30 from the outside of the holder, as illustrated in FIG. 4 of Japanese Unexamined Patent Publication No. 2003-272143. The holder includes a pair of members for holding an object from both sides thereof.

Each of the magnetic field application means 40 includes a pair of magnetic portions 41 and 42. The pair of magnetic portions 41 and 42 generates a magnetic field in a desired direction $H_x$ from one of the magnetic portions to the other magnetic portion. Further, the polarities of the magnetic portions 41 and 42 on the side facing the magnetic field application target 30 are different from each other. The polarities of the magnetic portions 41 and 42 are designed based on the desired direction $H_x$ of the magnetic field. In the example illustrated in FIG. 2A, the end of the magnetic portion 41 facing the magnetic field application target 30 is an N pole, and the other end thereof is an S pole. The end of the magnetic portion 42 facing the magnetic field application target 30 is an S pole, and the other end thereof is an N pole. The direction of the magnetic field generated from the magnetic portion 41 toward the magnetic portion 42 is a desired direction $H_x$ of the magnetic field. If the desired direction $H_x$ is a direction opposite to the direction illustrated in FIG. 2A, the end of the magnetic portion 41 facing the magnetic field application target 30 is an S pole, and that of the magnetic portion 42 facing the magnetic field application target 30 is an N pole.

A gap a between the magnetic portions 41 and 42 is designed as appropriate, based on the area of a magnetic field generation region, the intensity of the generated magnetic field, or the like. However, the gap a is not limited thereby. For example, the magnetic portions 41 and 42 are set so that the gap a is within the range of 0 mm (a state without a gap) through 10 mm.

The magnetic portion 41 is formed by three magnets 41a through 41c (each having an N pole on the side facing the magnetic field application target 30 and an S pole on the other side). The three magnets 41a through 41c are arranged so that magnetic force applied to the magnetic field application target 30 becomes weaker stepwise from the side of the magnetic portion 41, facing the magnetic portion 42, toward the opposite side thereof. The surfaces of the magnets 41a through 41c on the side opposite to the magnetic field application target 30 are flush. However, the surfaces of the magnets 41a through 41c on the side facing the magnet field application target 30 are positioned so that distances b1 through b3 between the magnetic field application target 30 and the magnets 41a through 41c, respectively, become longer stepwise from the side facing the other magnetic portion 42 (b1<b2<b3). If the handling characteristic of the magnetic portion 41 or the like is considered, it is preferable that the magnets 41a through 41c are joined together without any gaps therebetween. However, the magnets 41a through 41c may be placed with a gap therebetween.

The magnetic portion 42 is formed in a similar manner to the magnetic portion 41. The magnetic portion 42 is formed by three magnets 42a through 42c which are arranged so that distances between the magnets 42a through 42c and the magnetic field application target 30 become longer stepwise from the side of the magnetic portion 42, facing the other magnetic portion 41, toward the opposite side thereof. The magnetic portion 41 and the magnetic portion 42 are symmetrical with respect to the center plane of the gap therebetween (if no gap is present therebetween, with respect to a junction plane).

The kind of the magnets 41a through 41c which form the magnetic portion 41 and that of the magnets 42a through 42c which form the magnetic portion 42 are not limited. It is preferable that permanent magnets are used as the magnets 41a through 41c and the magnets 42a through 42c.

In the magnetic field application apparatus 1, the magnetic field application target 30 is rotated relative to the pair of magnetic field application means 40 in an arbitrary track direction. Therefore, it is possible to apply a magnetic field in a specific track direction $H_x$ to the entire surface of the magnetic field application target 30.

Figure 3A:
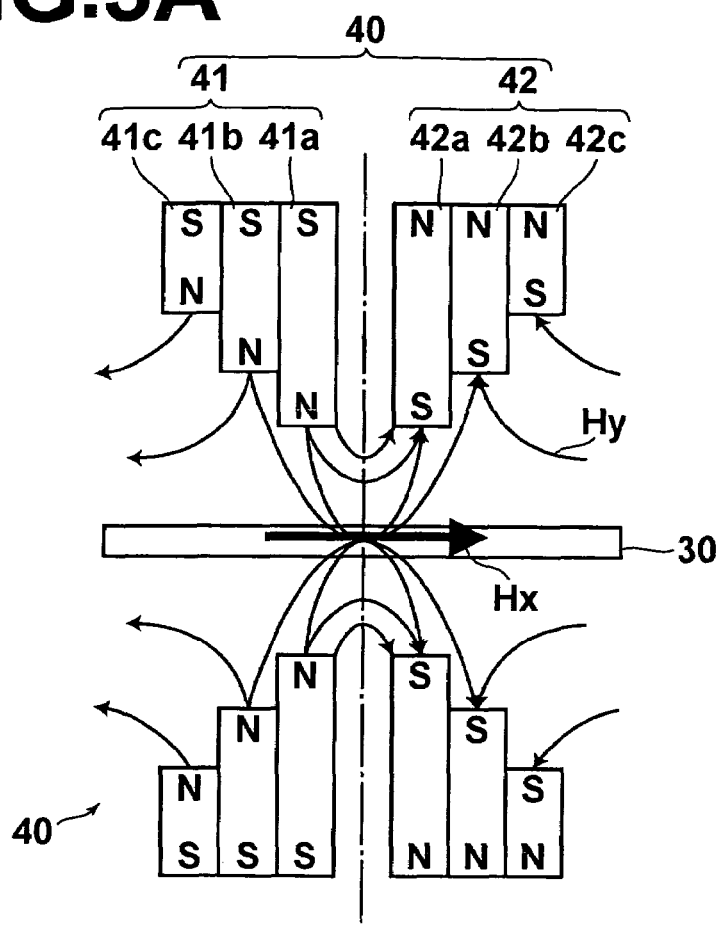
FIG. 3A is a diagram illustrating the direction of a magnetic field generated by the magnetic field application apparatus, illustrated in FIGS. 2A and 2B.
Figure 3B:
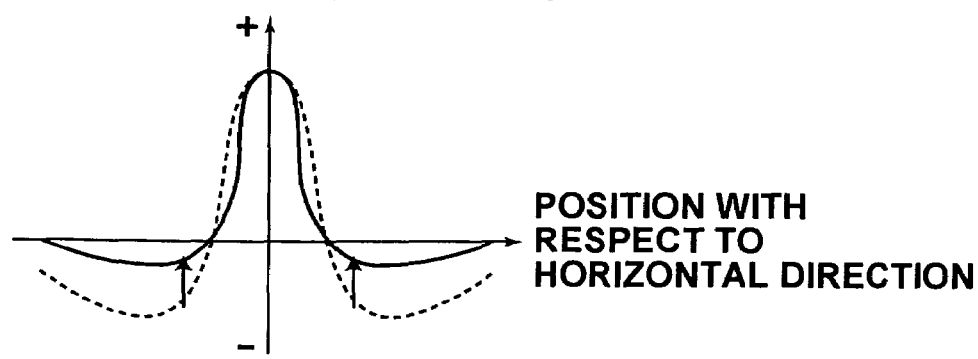
FIG. 3B is a diagram illustrating the distribution of the intensity of the magnetic field generated by the magnetic field application apparatus, illustrated in FIGS. 2A and 2B.

In the magnetic field application apparatus 1, a magnetic field indicated with an arrow in FIG. 3A is generated. The intensity of the magnetic field, applied to the magnetic field application target 30, is distributed with respect to a horizontal direction, as schematically illustrated in FIG. 3B. FIG. 3A is a side view of the magnetic field application apparatus 1, viewed from the opening 31 at the center of the magnetic field application target 30. In FIG. 3B, the horizontal axis shows positions of the magnetic field application target 30, corresponding to FIG. 3A, with respect to the track direction. The vertical axis shows the intensity of the magnetic field. In FIG. 3B, the intensity of the magnetic field in a desired direction $H_x$ is represented on the positive (+) side of the vertical axis. Here, the magnetic field in a perpendicular direction is cancelled out by a pair of magnetic field application means 40, each of which is symmetrically placed on either side of the magnetic field application target 30.

Therefore, the magnetic field in the perpendicular direction is not applied to the magnetic field application target 30.

In the magnetic field application apparatus 1, each of the magnets 41a through 41c and the magnets 42a through 42c generates a magnet field going from the N pole of each of the magnets to the S pole thereof. Therefore, a magnetic field in a direction (for example, direction $H_y$) opposite to the desired direction $H_x$ is generated by each of the magnets. However, the magnetic field in the opposite direction, generated by each of the magnets, is cancelled out by a magnetic field in the desired direction $H_x$, which is generated by an adjacent magnet on the outer side of each of the magnets. Therefore, the intensity of the magnetic field in the opposite direction becomes weaker. However, there are no adjacent magnets on the outer sides of the magnets 41c and 42c, which are outermost magnets in the magnetic portions 41 and 42, respectively. Therefore, the magnetic fields in the opposite direction, generated by the magnets 41c and 42c, remain.

Figure 7A:
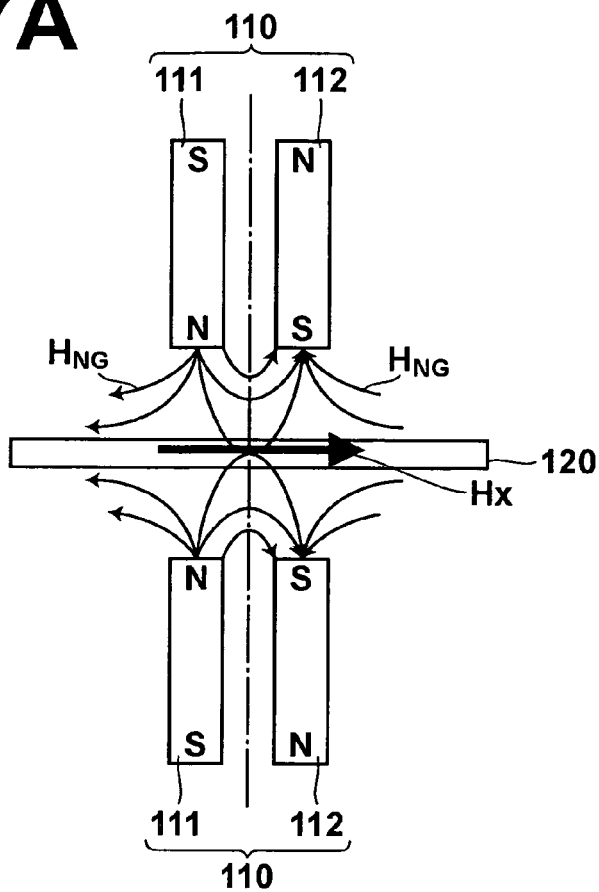
FIG. 7A is a diagram illustrating the direction of a magnetic field generated by a magnetic field application apparatus according to the related art.
Figure 7B:
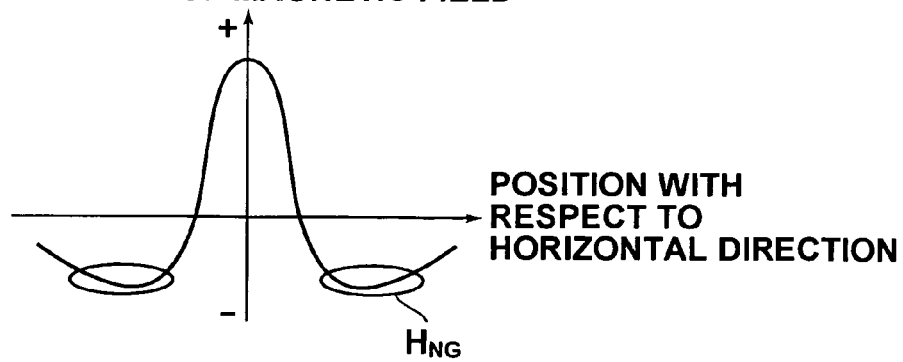
FIG. 7B is a diagram illustrating the distribution of the intensity of the magnetic field generated by the magnetic field application apparatus according to the related art.

In the present embodiment, the magnets 41a through 41c and the magnets 42a through 42c are set so that distances b1 through b3 between the magnets 41a through 41c and the magnetic field application target 30 and those between the magnets 42a through 42c and the magnetic field application target 30 become longer stepwise. Therefore, magnetic force applied to the magnetic field application target 30 becomes weaker stepwise. Hence, as illustrated in FIG. 3B, the intensity of the magnetic field in the opposite direction, applied to the magnetic field application target 30, is much lower than that of the magnetic field applied in the related art. (In FIG. 3B, the broken line represents the distribution of the intensity of the magnetic field generated by the magnetic field application apparatus according to the related art, illustrated in FIG. 7B.)

As described above, in the magnetic field application apparatus 1 according to the present embodiment, the magnetic field in the perpendicular direction is cancelled out by the pair of magnetic field application means 40. Therefore, the unnecessary magnetic field in the perpendicular direction is not applied to the magnetic field application target 30.

Further, in the magnetic field application apparatus 1, each of the magnetic field application means 40 has a pair of magnetic portions 41 and 42 which generate a magnetic field in a desired direction $H_x$ from one of the magnetic portions 41 and 42 to the other magnetic portion. The polarities of the magnetic portions 41 and 42 on the side facing the magnetic field application target 30 are different from each other. Further, each of the pair of magnetic portions 41 and 42 is formed so that magnetic force applied to the magnetic field application target 30 becomes weaker stepwise from the side, facing the other magnetic portion, toward the opposite side thereof. Therefore, generation of a magnetic field in a direction opposite to the desired direction $H_x$ before and after the magnetic field application means 40 (immediately before the magnetic field application target 30 enters a position between the pair of magnetic field application means 40 and immediately after the magnetic field application target 30 moves out from the position between the pair of magnetic field application means 40) is prevented.

As described above, generation of both of the magnetic field in the perpendicular direction and the magnetic field in the opposite direction can be prevented. Therefore, if magnetic transfer is performed using the magnetic field application apparatus 1, it is possible to prevent application of an unnecessary magnetic field in a direction other than the desired direction $H_x$ to the magnetic field application target 30. Hence, it is possible to perform highly accurate magnetic transfer. Further, if the slave medium 20 is initially magnetized and/or magnetization thereof is reversed using the magnetic transfer apparatus 1 according to the present embodiment, it is possible to produce a magnetic recording medium which has efficient magnetic transfer accuracy.

Second Embodiment

Figure 5A:
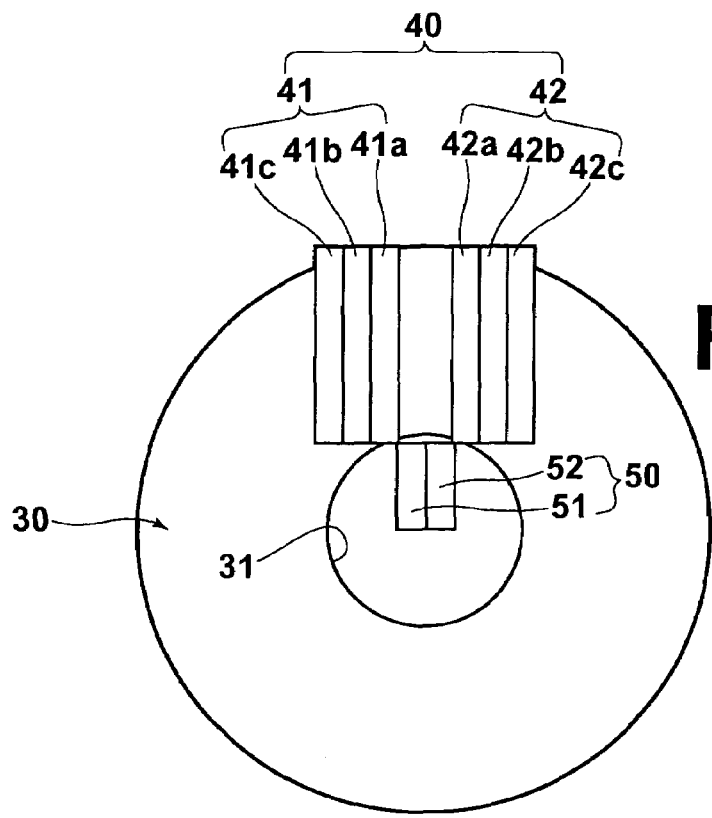
FIG. 5A is a top view of the magnetic field application apparatus illustrated in FIG. 4.

Next, a magnetic field application apparatus according the second embodiment of the present invention will be described with reference to FIGS. 4 and 5A (corresponding to FIGS. 2A and 2B). In FIGS. 4 and 5A, the same reference numerals will be used to denote the same elements as those in the first embodiment, and description thereof will be omitted.

A magnetic field application apparatus 2 according to the present embodiment is based on the magnetic field application apparatus 1 according to the first embodiment. The magnetic field application apparatus 2 further includes a reverse magnetic field generation means 50 on the side of each of the pair of magnetic field application means 40, closer to the center of the magnetic field application target 30. The reverse magnetic field generation means 50 generates a magnetic field in a direction opposite to that of the magnetic field generated by the magnetic field application means 40. In the present embodiment, the reverse magnetic field generation means 50 is arranged in an open region of the opening 31 at the center of the magnetic field application target 30.

Here, the magnetic field application means 40 and the reverse magnetic field generation means 50 on the upper side of the magnetic field application target 30 and those on the lower side thereof are symmetrical. Therefore, the magnetic field application means 40 and the reverse magnetic field generation means 50 on the lower side of the magnetic field application target 30 are omitted in FIGS. 4 and 5A.

The reverse magnetic field generation means 50 includes a pair of magnetic portions 51 and 52. The pair of magnetic portions 51 and 52 generates a magnetic field from one of the pair of magnetic portions 51 and 52 toward the other magnetic portion in a direction opposite to the desired direction $H_x$. The polarities of the magnetic portions 51 and 52 on the side facing the magnetic field application target 30 are different from each other. The magnetic portions 51 and 52 are arranged so that they are symmetrical with respect to the center plane of a gap (or, if no gap is present therebetween, with respect to a junction plane) between the pair of magnetic portions 41 and 42 which form the magnetic field application means 40. In the example illustrated in FIGS. 4 and 5A, the magnetic portion 51 on the side closer to the magnetic portion 41 has an S pole on the side facing the magnetic field application target 30 and an N pole on the other side (the polarities of the magnetic portion 51 are opposite to those of the magnetic portion 41). Further, the magnetic portion 52 on the side closer to the magnetic portion 42 has an N pole on the side facing the magnetic field application target 30 and an S pole on the other side (the polarities of the magnetic portion 52 are opposite to those of the magnetic portion 42).

In FIGS. 4 and 5A, the magnetic portions 51 and 52 are joined together without a gap therebetween. However, the pair of magnetic portions 51 and 52 may be arranged so that a gap is provided therebetween. Further, in FIGS. 4 and 5A, the magnetic portion 41 and the magnetic portion 51 do not overlap each other, and the magnetic portion 42 and the magnetic portion 52 do not overlap each other. However, it is preferable that the magnetic portion 41 and the magnetic portion 51 are arranged so that at least a part thereof overlaps with each other. Further, it is preferable that the magnetic portion 42 and the magnetic portion 52 are arranged so that at least a part thereof overlaps with each other. Particularly, it is preferable that the magnetic portion 51 and the magnetic portion 52 are joined together, and that the magnetic portion 41 and the magnetic portion 51 are at least partially joined together, and that the magnetic portion 42 and the magnetic portion 52 are at least partially joined together. If the magnetic portions are joined as described above, the magnetic portions 41 and 42 and the magnetic portions 51 and 52 adhere to each other, and the handling characteristic of the magnetic field application apparatus 2 can be improved.

Figure 5B:
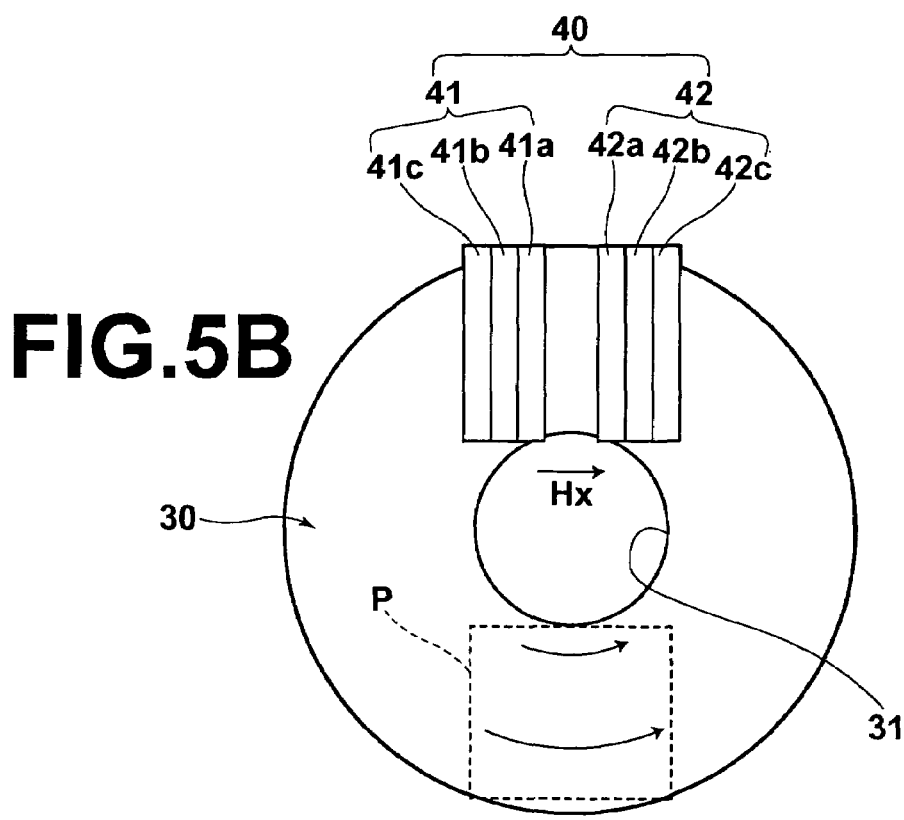
FIG. 5B is a diagram illustrating a difference between the magnetic field application apparatus illustrated in FIG. 4 and the magnetic field application apparatus illustrated in FIG. 2A.

In the magnetic field application apparatus 1 according to the first embodiment, the reverse magnetic field generation means 50 is not provided. Therefore, the magnetic field in the desired direction $H_x$, applied by the magnetic field application apparatus 1, may reach a region P on the opposite side of the opening 31 at the center of the magnetic field application target 30, as illustrated in FIG. 5B. The region P and a region to which the magnetic field is applied by the magnetic field application apparatus 1 are symmetrically positioned, and the direction of the magnetic field in the region P is opposite to the desired direction.

However, in the present embodiment, the reverse magnetic field generation means 50 is further provided on the side of each of the pair of magnetic field application means 40, closer to the center of the magnetic field application target 30. Therefore, a magnetic field in the desired direction $H_x$ is applied to a region between the pair of magnetic field application means 40, and an unnecessary magnetic field can be cancelled out at the same time. The unnecessary magnetic field is a magnetic field which spreads in a horizontal direction from the pair of magnetic field application means 40 toward the center of the magnetic field application target 30.

In the present embodiment, the reverse magnetic field generation means 50 is provided only in the open region of the opening 31 at the center of the magnetic field application target 30. However, since the magnetic field applied to the region P by the reverse magnetic field generation means 50 is a magnetic field in the desired direction, the reverse magnetic field generation means 50 may be arranged so as to extend from the open region of the opening 31 at the center to the region P (the region P and the region to which the magnetic field is applied by the magnetic field application means 40 are symmetrically positioned on both sides of the opening 31 at the center).

The magnetic field application apparatus 2 according to the present embodiment is based on the magnetic field application apparatus 1 according to the first embodiment. The magnetic field application apparatus 2 according to the present embodiment includes the reverse magnetic field generation means 50 on the side of the magnetic field application means 40, closer to the center of the magnetic field application target 30. Therefore, it is possible to achieve an advantage effect similar to that achieved in the first embodiment. Further, it is possible to prevent generation of a magnetic field in a direction opposite to the desired direction in the region P on the opposite side of the opening 31 at the center of the magnetic field application target 30. Hence, it is possible to perform more accurate magnetic transfer. Here, the region P and the region to which the magnetic field is applied are symmetrically positioned. Unlike the magnetic field application apparatus 2, in the magnetic field application apparatus 1, the magnetic field in the opposite direction is generated in the region P by a magnetic field which spreads in a horizontal direction from the pair of magnetic field application means 40 toward the center of the magnetic field application target 30.

Third Embodiment

Figure 6:
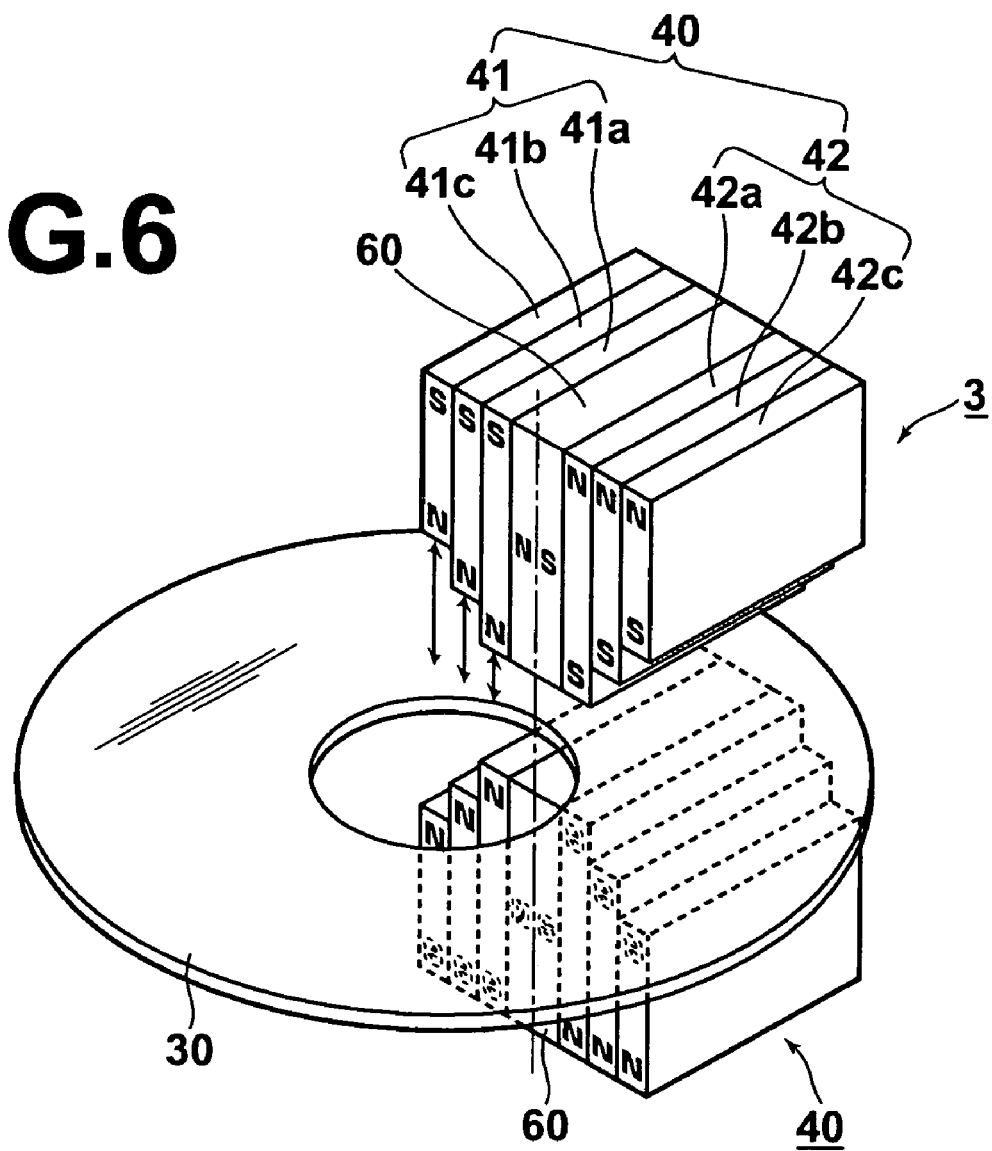
FIG. 6 is a perspective view of a magnetic field application apparatus according to a third embodiment of the present invention.

Next, a magnetic field application apparatus according to a third embodiment of the present invention will be described with reference to FIG. 6. In FIG. 6, the same reference numerals will be used to denote the same elements as those in the first embodiment, and description thereof will be omitted.

A magnetic field application apparatus 3 according to the present embodiment is based on the magnetic field application apparatus 1 according to the first embodiment. A permanent magnet 60 is further provided between the pair of magnetic portions 41 and 42 in each of the magnetic field application means 40. The permanent magnet 60 is magnetized in a direction perpendicular to that of magnetization of the pair of magnetic portions 41 and 42. The permanent magnet 60 generates a magnetic field in the same direction (a magnetic field in the desired direction $H_x$) as that of the magnetic field generated from one of the pair of magnetic portions 41 and 42 toward the other magnetic portion. In the example illustrated in FIG. 6, the side of the permanent magnet 60, facing the magnetic portion 41, is an N pole, and the side of the permanent magnet 60, facing the magnetic portion 42, is an S pole.

The magnetic field application apparatus 3 according to the present embodiment is based on the magnetic field application apparatus 1 according to the first embodiment, and the permanent magnet is further provided. Therefore, it is possible to achieve an advantage effect similar to that achieved in the first embodiment. Further, it is possible to increase the intensity of the magnetic field generated in the desired direction $H_x$ and to increase the capacity of the magnetic recording medium. It is preferable that the permanent magnet 60 is provided in each of the magnetic field application means 40. However, the permanent magnet 60 may be provided only in one of the pair of magnetic field application means 40.

DESIGN MODIFICATION EXAMPLE

The magnetic field application apparatus according to the present invention is not limited to the first embodiment through the third embodiment. The present invention may be modified as appropriate without deviating from the scope and spirit of the present invention.

In the above description, the magnetic portions 41 and 42 which form the magnetic field application means 40 include three magnets 41a through 41c and three magnets 42a through 42c, respectively. However, the number of the magnets may be determined as appropriate in designing of the magnetic field application means 40. Further, it is not necessary that the magnetic portions 41 and 42 are symmetrical, and the number of the magnets of the magnetic portion 41 may be different from that of the magnetic portion 42. Further, the magnetic portion 41 may be formed by a single magnet by joining the magnets 41a through 41c, and the magnetic portion 42 may be formed by a single magnet by joining the magnets 42a through 42c.

In the above description, the plurality of magnets 41a through 41c and the plurality of magnets 42a through 42c are arranged so that distances from the magnetic field application target 30 to the magnets increase stepwise. However, the magnetic portions 41 and 42 may be formed by changing the material of each of the magnets 41a through 41c and 42a through 42c or the like, instead of changing the distance from the magnetic field application target 30 to each of the magnets 41a through 41c and 42a through 42c. In that case, in each of the magnetic portions 41 and 42, the material of each of the magnets 41a through 41c and the magnets 42a through 42c is changed so that magnetic force applied to the magnetic field application target 30 becomes weaker from the side of each of the magnetic portions 41 and 42, facing the other magnetic portion, toward the opposite side thereof.

In the above description, each of the magnetic portions 41 and 42 is formed so that magnetic force applied to the magnetic field application target 30 becomes weaker "stepwise" from the side of each of the magnetic portions 41 and 42, facing the other magnetic portion, toward the opposite side thereof. However, each of the magnetic portions 41 and 42 may be formed so that magnetic force applied to the magnetic field application target 30 becomes "continuously" weaker from the side of each of the magnetic portions 41 and 42, facing the other magnetic portion, toward the opposite side thereof. The magnetic force becomes continuously weaker by forming the lower surface of the plurality of magnets 41a through 41c into a slant face and by forming that of the plurality of magnets 42a through 42c into a slant face. However, if easiness of production of the magnetic portions 41 and 42 or the like is considered, it is preferable that each of the magnetic portions 41 and 42 is formed by combining a plurality of magnets which have flat lower surfaces.

In each of the design modification examples, the pair of magnetic portions 41 and 42 in the magnetic field application means 40 is formed so that magnetic force applied from each of the magnets to the magnetic field application target 30 becomes weaker stepwise or continuously from the side of each of the magnetic portions, facing the other magnetic portion, toward the opposite side thereof. Therefore, it is possible to prevent generation of a magnetic field in a direction opposite to the desired direction $H_x$ at positions before and after the magnetic field application means 40. Hence, it is possible to perform highly accurate magnetic transfer.

"Magnetic Transfer Apparatus"

Next, a magnetic transfer apparatus according to the present invention will be briefly described.

The magnetic transfer apparatus includes, for example, a housing (not illustrated) for housing a slave medium 20 which has not been magnetized. The magnetic transfer apparatus also includes an initial magnetization unit (not illustrated) for initially magnetizing the slave medium 20. The magnetic transfer apparatus also includes a magnetization reversal unit (not illustrated). The magnetization reversal unit applies a magnetic field in a direction opposite to that of the initial magnetization while an initially magnetized slave medium 20 and the original disk 10 for transfer are placed in close contact with each other. Accordingly, magnetization of the slave medium 20 is reversed, and a signal pattern is transferred onto the slave medium 20. The magnetic transfer apparatus also includes a conveyance means for conveying the slave medium 20 from the housing for housing the slave medium to the initial magnetization unit. The conveyance means also conveys the slave medium 20 from the initial magnetization unit to the magnetization reversal unit. The magnetization reversal unit also functions as the initial magnetization unit in some cases.

The initial magnetization unit includes, for example, a magnetic field application apparatus and a relative rotation means. The magnetic field application apparatus applies a magnetic field to the slave medium 20. The relative rotation means rotates the slave medium 20 relative to the magnetic field application apparatus. An openable/closable holder for holding the slave medium 20 is provided in the initial magnetization unit, if necessary. The holder holds the slave medium 20 so that the holder may be attached thereto and/or detached therefrom.

The magnetization reversal unit includes, for example, an openable/closable holder, a magnetic field application apparatus, and a relative rotation means. The holder holds the original disk 10 for transfer and the slave medium 20 so that the holder may be attached thereto and/or detached therefrom. The magnetic field application apparatus applies a magnetic field to the original disk 10 for transfer and the slave medium 20 from the outside of the holder. The relative rotation means rotates the holder relative to the magnetic field application apparatus.

The magnetic field application apparatus of the initial magnetization unit and that of the magnetization reversal unit may be different from each other. Alternatively, the same magnetic field application apparatus may be used in both of the initial magnetization unit and the magnetization reversal unit. In any case, the magnetic field application apparatus according to the present invention is used to initially magnetize the slave medium 20 and/or to reverse magnetization thereof in the magnetic transfer apparatus according to the present invention.

The magnetic transfer apparatus according to the present invention includes the magnetic field application apparatus according to the present invention to initially magnetize and/or to reverse magnetization thereof. Therefore, it is possible to prevent application of an unnecessary magnetic field to the magnetic field application target 30 when the magnetic field application target 30 is initially magnetized and/or magnetization thereof is reversed. Hence, it is possible to perform highly accurate magnetic transfer.

What is claimed is:

1. A magnetic field application apparatus for initially magnetizing a slave medium and/or for reversing magnetization thereof in magnetic transfer of a signal pattern onto the slave medium,
   wherein the magnetic transfer is performed by initially magnetizing the slave medium in a predetermined direction, by placing the slave medium and an original disk for transfer in close contact with each other after initial magnetization and by applying a magnetic field in a direction opposite to that of initial magnetization so as to
   reverse magnetization of the slave medium based on a pattern on a surface of the original disk for transfer, the apparatus comprising:
   a pair of magnetic field application means, each of which is arranged, at least during application of a magnetic field, on either side of a magnetic field application target so as to face each other,
   and which generate a magnetic field in a desired direction, wherein
   each of the magnetic field application means includes a pair of magnetic portions which generate a magnetic field in a desired direction from one of the magnetic portions toward the other magnetic portion, and of which the polarities on the side facing the magnetic field application target are different from each other, wherein each of the magnetic portions is formed so that magnetic force applied to the magnetic field application target becomes weaker stepwise or continuously from the side of the magnetic portion, facing the other magnetic portion, toward the opposite side thereof,
   wherein each magnetic portion of the pair of magnetic portions includes a plurality of magnets which are arranged so that magnetic force applied to the magnetic field application target becomes weaker from the side of the magnetic portion, facing the other magnetic portion, toward the opposite side thereof.

2. A magnetic field application apparatus as defined in claim 1, wherein each magnetic portion of the pair of magnetic portions includes a plurality of magnets which are arranged so that a distance between each of the plurality of magnets and the magnetic field application target becomes longer from the side of the magnetic portion, facing the other magnetic portion, toward the opposite side thereof.

3. A magnetic field application apparatus as defined in claim 1, wherein the slave medium is disk-shaped, and wherein the pair of magnetic field application means applies a magnetic field in a track direction to the magnetic field application target, the apparatus further comprising:
   a reverse magnetic field generation means for generating a magnetic field in a direction opposite to that of the magnetic field generated by the magnetic field application means, wherein the reverse magnetic field generation means is provided on the side of the pair of magnetic field application means, closer to the center of the magnetic field application target.

4. A magnetic field application apparatus as defined in claim 3, wherein the magnetic field application means and the reverse magnetic field generation means on a first side of the magnetic field application target are symmetrical to the magnetic field application means and the reverse magnetic field generation means on the other side thereof.

5. A magnetic field application apparatus as defined in claim 1, wherein at least one of the pair of magnetic field application means further includes a permanent magnet between the pair of magnetic portions, wherein the permanent magnet is magnetized in a direction perpendicular to that of magnetization of the pair of magnetic portions, and wherein the permanent magnet generates a magnetic field in the same direction as that of the magnetic field generated from one of the pair of magnetic portions toward the other magnetic portion.

6. A magnetic transfer apparatus for transferring a signal pattern onto a slave medium by initially magnetizing the slave medium in a predetermined direction, by placing the slave medium and an original disk for transfer in close contact with each other after initial magnetization and by applying a magnetic field in a direction opposite to that of initial magnetization so as to reverse magnetization of the slave medium based on a pattern on a surface of the original disk, the apparatus comprising:
   a magnetic field application apparatus for initially magnetizing the slave medium and/or for reversing magnetization thereof, as defined in claim 1.

7. A method for producing a magnetic recording medium, the method comprising the steps of:
   initially magnetizing a slave medium in a predetermined direction;
   placing the slave medium and an original disk for transfer in close contact with each other after initial magnetization; and
   applying a magnetic field in a direction opposite to that of initial magnetization so as to reverse magnetization of the slave medium based on a pattern on a surface of the original disk for transfer, wherein the slave medium is initially magnetized and/or magnetization thereof is reversed using a magnetic field application apparatus as defined in claim 1.

8. A magnetic field application apparatus as defined in claim 1, wherein the plurality of magnets are joined together without any gaps therebetween.

9. A magnetic field application apparatus as defined in claim 1, wherein the plurality of magnets of a first magnetic portion of the plurality of magnetic portions is symmetrical to the plurality of magnets of a second magnetic portion with respect to the central plane between the pair of magnetic portions.

10. A magnetic field application apparatus as defined in claim 1, wherein each of the plurality of magnets making up each magnetic portion of the plurality of the magnetic portions is of the same polarity.

11. A magnetic field application apparatus as defined in claim 1, wherein the magnetic field in the opposite direction of the desired direction generated by each magnet of the plurality of magnets is canceled out by a magnetic field in the desired direction generated by an adjacent magnet on an outer side of each of the magnets.

12. A magnetic field application apparatus as defined in claim 1, wherein the pair of magnetic portions are permanent magnets.

13. A magnetic field application apparatus as defined in claim 1, wherein the side of the magnetic portion facing the other magnetic portion is closer to the magnetic field application target than the opposite side thereof.

* * * * *